(12) United States Patent
Cai et al.

(10) Patent No.: US 10,284,458 B2
(45) Date of Patent: May 7, 2019

(54) FLOW TABLE MODIFYING METHOD, FLOW TABLE MODIFYING APPARATUS, AND OPENFLOW NETWORK SYSTEM

(71) Applicant: HUAWEI TECHNOLOGIES CO., LTD., Shenzhen (CN)

(72) Inventors: Hui Cai, Shenzhen (CN); Weiqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 15/218,613

(22) Filed: Jul. 25, 2016

(65) Prior Publication Data

US 2016/0337228 A1   Nov. 17, 2016

Related U.S. Application Data

(63) Continuation of application No. PCT/CN2014/071264, filed on Jan. 23, 2014.

(51) Int. Cl.
*H04L 12/751*   (2013.01)
*H04L 12/715*   (2013.01)
(Continued)

(52) U.S. Cl.
CPC .......... *H04L 45/02* (2013.01); *H04L 41/0631* (2013.01); *H04L 43/026* (2013.01);
(Continued)

(58) Field of Classification Search
None
See application file for complete search history.

(56) References Cited

U.S. PATENT DOCUMENTS

2007/0271374 A1* 11/2007 Shomura ............... H04L 43/022
 709/224
2011/0273988 A1* 11/2011 Tourrilhes ........... H04L 41/0816
 370/237
(Continued)

FOREIGN PATENT DOCUMENTS

CN   101325597 A   12/2008
CN   102859952 A    1/2013
(Continued)

OTHER PUBLICATIONS

International Search Report and Written Opinion dated Oct. 31, 2014 in corresponding International Patent Application No. PCT/CN2014/071264.
(Continued)

*Primary Examiner* — Jamaal R Henson
(74) *Attorney, Agent, or Firm* — Staas & Halsey LLP

(57) ABSTRACT

The present invention relates to a flow table modifying method, a flow table modifying apparatus, and an OpenFlow network system. The flow table modifying method includes: receiving, by a switch, a modify flow entry message sent by a controller; searching, by the switch, a flow table corresponding to a flow table identifier for whether there is a flow entry matching to-be-modified target information; and in a case in which there is the flow entry matching the to-be-modified target information, changing, by the switch, a match field in the matched flow entry to a new match field. According to the flow table modifying method in an embodiment of the present invention, the switch searches the flow table corresponding to the flow table identifier for the flow entry matching the to-be-modified target information and changes the match field in the matched flow entry to the new match field.

14 Claims, 5 Drawing Sheets

(51) Int. Cl.
*H04L 12/24* (2006.01)
*H04L 12/721* (2013.01)
*H04L 12/741* (2013.01)
*H04L 12/947* (2013.01)
*H04L 12/26* (2006.01)

(52) U.S. Cl.
CPC .............. *H04L 45/38* (2013.01); *H04L 45/64* (2013.01); *H04L 45/74* (2013.01); *H04L 49/25* (2013.01)

(56) References Cited

U.S. PATENT DOCUMENTS

2011/0310734 A1* 12/2011 Mizukoshi .............. H04L 45/42
370/231
2011/0317559 A1* 12/2011 Kern ....................... H04L 45/02
370/235
2012/0263186 A1* 10/2012 Ueno .................... H04L 45/306
370/401
2013/0114615 A1* 5/2013 Suemitsu ............ H04L 47/2441
370/401
2013/0163427 A1 6/2013 Belveau et al.

FOREIGN PATENT DOCUMENTS

| CN | 103326943 A | 9/2013 |
| CN | 103384223 A | 11/2013 |
| CN | 103500191 A | 1/2014 |

OTHER PUBLICATIONS

International Search Report dated Oct. 31, 2014 in corresponding International Application No. PCT/CN2014/071264.
Russian Decision of Grant dated Mar. 21, 2018 in corresponding Russian Patent Application No. 2016132459/08(050347).

* cited by examiner

FLOW TABLE MODIFYING METHOD, FLOW TABLE MODIFYING APPARATUS, AND OPENFLOW NETWORK SYSTEM

CROSS-REFERENCE TO RELATED APPLICATIONS

This application is a continuation of International Application No. PCT/CN2014/071264, filed on Jan. 23, 2014, which is hereby incorporated by reference in its entirety.

TECHNICAL FIELD

Embodiments of the present invention relate to the field of communications technologies, and in particular, to a flow table modifying method, a flow table modifying apparatus, and an OpenFlow network system.

BACKGROUND

As network technologies continuously develop, software-defined networking (SDN) appears, where an OpenFlow (OF) protocol is a typical technology of the SDN. Network elements of the OF protocol include an OF controller (controller) and an OF switch (switch), where the OF controller is called a controller for short, and the OF switch is called a switch for short. The controller determines, according to features of a packet such as a 5-tuple, an Ethernet frame header, and a virtual local area network (VLAN) identifier (ID), a forwarding action of a service flow such as forwarding, discarding, modifying a packet header, encapsulating, or decapsulating, and sends, to the switch, a flow rule corresponding to the service flow and one or more actions to be correspondingly performed. The switch receives and stores the flow rule sent by the controller, and performs an action corresponding to the flow rule on a subsequent packet that complies with the flow rule, so as to implement packet forwarding or processing.

First, the controller sends the flow rule to the switch by using a modify flow entry message (Flow_Mod). The flow rule includes a flow match rule and a corresponding processing action. The flow match rule may include a combination of information such as the Ethernet frame header, Internet Protocol (IP) header information, or a Transmission Control Protocol (TCP)/User Datagram Protocol (UDP) port number. The processing action includes a processing type and a related parameter, where the processing type is, for example, forwarding, discarding, modifying, encapsulating, or decapsulating. The controller may send flow match rules of different flow tables (flow table) to the switch by using multiple modify flow entry messages. Then, the switch stores or installs, in a flow table, all flow match rules and corresponding processing actions that are received from the controller. Finally, when the switch receives a packet sent by a user, the switch performs flow table matching, and processes, according to an action set corresponding to a matching flow rule, the packet sent by the user.

The OF protocol may implement adding, modifying, or deleting of a flow rule by using a modify flow entry message. However, the controller can complete modifying a flow entry only by using an action of adding or deleting a flow table entry. For example, two modify flow entry messages need to be sent for modifying a flow entry of a MAC address and an IP address. First, the controller sends, to the switch, a modify flow entry message that carries a deleting instruction to delete the flow entry, where a match field carries (a source IP address that is equal to IP2 and a source MAC address that is equal to MAC2). Then, the controller sends, to the switch, a modify flow entry message that carries an adding instruction to add a new flow entry, where a match field in the new flow entry carries (a source IP address that is equal to IP3 and a source MAC address that is equal to MAC3). To modify N flow entries, the controller needs to send 2N modify flow entry messages to the switch, where each modify flow entry message carries a complete match (match) or action (action) field.

In conclusion, a general method for modifying a flow table has disadvantages of information redundancy, low efficiency, and an overloaded interface.

SUMMARY

In view of this, a technical problem to be resolved in the present invention is how to improve efficiency of modifying a flow table and reduce load on an interface.

To resolve the foregoing technical problem, according to a first aspect, the present invention provides a flow table modifying method, including:

receiving, by a switch, a modify flow entry message sent by a controller, where the modify flow entry message includes a flow table identifier, an operation type, to-be-modified target information, and a new match field;

searching, by the switch, a flow table corresponding to the flow table identifier for whether there is a flow entry matching the to-be-modified target information; and in a case in which there is the flow entry matching the to-be-modified target information, changing, by the switch, a match field in the matched flow entry to the new match field.

With reference to the first aspect, in a first possible implementation manner of the first aspect, the to-be-modified target information is a flow table associated value; and the searching, by the switch, a flow table corresponding to the flow table identifier for whether there is a flow entry matching the to-be-modified target information includes:

determining, by the switch in the flow table, whether a flow table associated value in a currently found flow entry matches the received flow table associated value; and if the flow table associated value in the currently found flow entry matches the received flow table associated value, determining the currently found flow entry as the matched flow entry.

With reference to the first aspect, in a second possible implementation manner of the first aspect, the to-be-modified target information is an old match field; and the searching, by the switch, a flow table corresponding to the flow table identifier for whether there is a flow entry matching the to-be-modified target information includes:

determining, by the switch in the flow table, whether a match field in a currently found flow entry matches the old match field; and if the match field in the currently found flow entry matches the old match field, determining the currently found flow entry as the matched flow entry.

With reference to the first aspect, the first possible implementation manner of the first aspect, or the second possible implementation manner of the first aspect, in a third possible implementation manner of the first aspect, in a case in which there is no flow entry matching the to-be-modified target information, the switch sends an error indication to the controller, where the error indication is used to notify the controller of a failure in modifying the flow table.

According to a second aspect, the present invention provides a flow table modifying method, including:

sending, by a controller, a modify flow entry message to a switch, where the modify flow entry message includes a flow table identifier, an operation type, to-be-modified target information, and a new match field, and the modify flow entry message is used to instruct the switch to search a flow table corresponding to the flow table identifier for a flow entry matching the to-be-modified target information and to change a match field in the matched flow entry to the new match field.

With reference to the second aspect, in a first possible implementation manner of the second aspect, the to-be-modified target information is a flow table associated value or an old match field.

With reference to the second aspect or the first possible implementation manner of the second aspect, in a second possible implementation manner of the second aspect, the controller receives an error indication sent by the switch, where the error indication is used to notify the controller of a failure in modifying the flow table.

According to a third aspect, the present invention provides a flow table modifying apparatus, including:

a receiving module, configured to receive a modify flow entry message sent by a controller, where the modify flow entry message includes a flow table identifier, an operation type, to-be-modified target information, and a new match field;

a searching module, connected to the receiving module and configured to search a flow table corresponding to the flow table identifier for whether there is a flow entry matching the to-be-modified target information received by the receiving module; and a modifying module, connected to the searching module and configured to: in a case in which the searching module finds that there is the flow entry matching the to-be-modified target information, change a match field in the matched flow entry to the new match field.

With reference to the third aspect, in a first possible implementation manner of the third aspect, the to-be-modified target information is a flow table associated value, and the searching module is configured to:

determine, in the flow table, whether a flow table associated value in a currently found flow entry matches the flow table associated value received by the receiving module; and if it is determined that the flow table associated value in the currently found flow entry matches the flow table associated value received by the receiving module, determine the currently found flow entry as the matched flow entry.

With reference to the third aspect, in a second possible implementation manner of the third aspect, the to-be-modified target information is an old match field, and the searching module is configured to:

determine, in the flow table, whether a match field in a currently found flow entry matches the old match field received by the receiving module; and if it is determined that the match field in the currently found flow entry matches the old match field received by the receiving module, determine the currently found flow entry as the matched flow entry.

With reference to the third aspect, the first possible implementation manner of the third aspect, or the second possible implementation manner of the third aspect, in a third possible implementation manner of the third aspect, the flow table modifying apparatus further includes:

a sending module, connected to the searching module and configured to: in a case in which the searching module finds that there is no flow entry matching the to-be-modified target information, send an error indication to the controller, where the error indication is used to notify the controller of a failure in modifying the flow table.

According to a fourth aspect, the present invention provides a flow table modifying apparatus, including:

a sending module, configured to send a modify flow entry message to a switch, where the modify flow entry message includes a flow table identifier, an operation type, to-be-modified target information, and a new match field, and the modify flow entry message is used to instruct the switch to search a flow table corresponding to the flow table identifier for a flow entry matching the to-be-modified target information and to change a match field in the matched flow entry to the new match field.

With reference to the fourth aspect, in a first possible implementation manner of the fourth aspect, the to-be-modified target information is a flow table associated value or an old match field.

With reference to the fourth aspect or the first possible implementation manner of the fourth aspect, in a second possible implementation manner of the fourth aspect, the flow table modifying apparatus further includes:

a receiving module, configured to receive an error indication sent by the switch, where the error indication is used to notify the flow table modifying apparatus of a failure in modifying the flow table.

According to a fifth aspect, the present invention provides an OpenFlow network system, including: a switch and a controller, where:

the flow table modifying apparatus in the third aspect or in any possible implementation manner from the first possible implementation manner of the third aspect to the third possible implementation manner of the third aspect is used as the switch; and the flow table modifying apparatus in the fourth aspect or in any possible implementation manner from the first possible implementation manner of the fourth aspect to the second possible implementation manner of the fourth aspect is used as the controller.

According to the flow table modifying method, the flow table modifying apparatus, and the OpenFlow network system in the embodiments, a switch receives a modify flow entry message sent by a controller, searches a flow table corresponding to a flow table identifier for a flow entry matching to-be-modified target information, and changes a match field in the matched flow entry to a new match field, so that the flow table is efficiently modified and load on an interface is alleviated. In addition, only the flow entry matching the to-be-modified target information is modified, so that information redundancy of modifying the flow table is low.

Exemplary embodiments are described in detail with reference to accompanying drawings to make other features and aspects of the present invention clearer.

BRIEF DESCRIPTION OF DRAWINGS

Accompanying drawings included in the specification and constituting a part of the specification and the specification illustrate exemplary embodiments, features, and aspects of the present invention, and are used for explaining principles of the present invention.

DESCRIPTION OF EMBODIMENTS

Figures 1, 2:
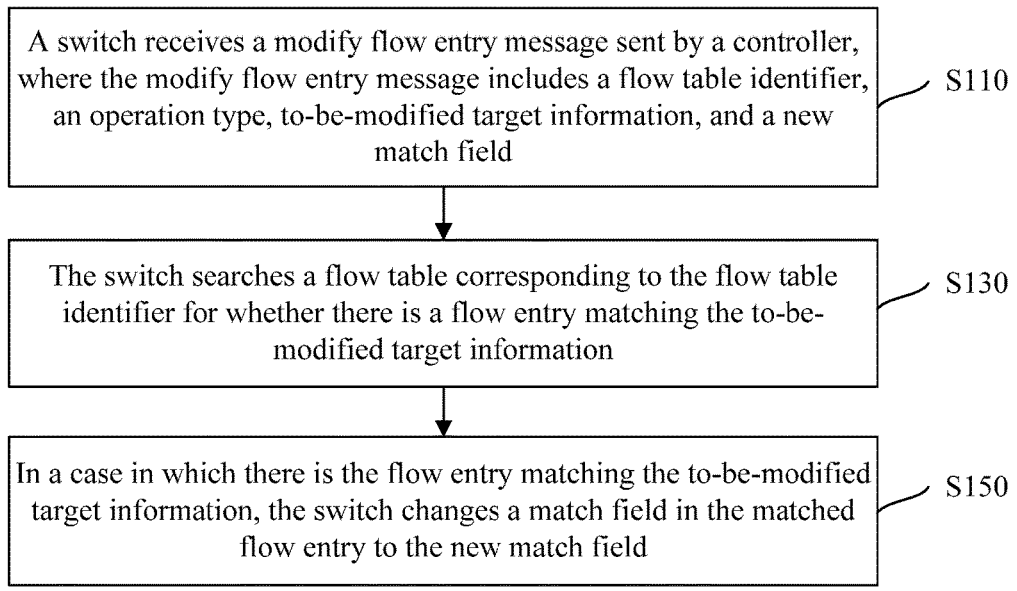
FIG. 1 is a flowchart of a flow table modifying method according to Embodiment 1 of the present invention.
FIG. 2 is a flowchart of a flow table modifying method according to Embodiment 2 of the present invention.

The following describes various exemplary embodiments, features, and aspects of the present invention in detail with reference accompanying drawings. Same reference numerals in the accompanying drawings designate elements that have same or similar functions. Various aspects of the embodiments illustrated in the accompanying drawings may not be necessarily drawn to scale, unless otherwise specified.

The word "exemplary" specially used herein indicates "used as an example or embodiment, or illustrative". Any embodiment that is described as an exemplary embodiment should not be construed to be preferred over or better than another embodiment.

In addition, numerous specific details are set forth in the following specific embodiments in order to better describe the present invention. However, a person skilled in the art should understand that the present invention may be practiced without some specific details. In some other instances, methods, means, elements, and circuits well known to a person skilled in the art are not described in detail so as to highlight the subject matter of the present invention.

As described in Background and Summary, an OF network system includes a controller and a switch, where the controller sends a flow table to the switch according to an OpenFlow protocol by using a modify flow entry message, and the switch receives and stores the flow table sent by the controller. Matching is performed between all packets passing the switch and flow entries (flow entry) stored in the switch. According to a current OF protocol, the switch may support multiple flow tables, where each flow table includes flow entries, and each flow entry includes a match field, a counter, and an operation. Matching is performed between a packet and a match field in a flow entry of the first flow table stored in the switch. In a case in which the packet matches a flow entry of the first flow table, an operation in the flow entry is performed. If the operation in the matched flow entry includes further jumping to a next flow table, jumping to the next flow table for matching a flow entry is performed after other operations are performed. If the operation in the matched flow entry does not include jumping to a next flow table, flow table matching ends, and an action set (action set) corresponding to the packet is performed, for example, forwarding the packet to a specified output port, discarding the packet, or modifying a packet header.

In the embodiments of the present invention, the controller may control, by modifying a flow entry, a flow table stored in the switch.

Embodiment 1

FIG. 1 is a flowchart of a flow table modifying method according to Embodiment 1 of the present invention. As shown in FIG. 1, the flow table modifying method mainly includes:

Step S110: A switch receives a modify flow entry message sent by a controller, where the modify flow entry message includes a flow table identifier, an operation type, to-be-modified target information, and a new match field.

Specifically, if the switch receives the modify flow entry message sent by the controller, the switch may perform corresponding processing on a flow entry specified by the to-be-modified target information. In addition to the flow table identifier, the to-be-modified target information, and the new match field, the modify flow entry message should further include the operation type. In addition to deleting and adding, the operation type may further include modifying. The switch may determine, according to the flow table identifier, a flow table that needs to be modified, further determine, according to the to-be-modified target information, a flow entry that needs to be modified in the flow table that needs to be modified, and change a match field in the flow entry that needs to be modified to the new match field, where the flow entry that needs to be modified is a flow entry matching the to-be-modified target information.

Step S130: The switch searches a flow table corresponding to the flow table identifier for whether there is a flow entry matching the to-be-modified target information.

Specifically, after receiving the modify flow entry message from the controller, the switch may determine, according to the flow table identifier, a flow table that needs to be modified, and search the flow table that needs to be modified for whether there is a flow entry matching the to-be-modified target message. The to-be-modified target information may be a flow table associated value or an old match field.

In a case in which the to-be-modified target information is the flow table associated value, that the switch searches a flow table corresponding to the foregoing flow table identifier for whether there is a flow entry matching the to-be-modified target information may include: determining, by the switch in the flow table, whether a flow table associated value in a currently found flow entry matches the received flow table associated value; and if the flow table associated value in the currently found flow entry matches the received flow table associated value, determining the currently found flow entry as the matched flow entry.

Specifically, the to-be-modified target information in the modify flow entry message may be the flow table associated value. However, the switch merely stores the flow table associated value and does not perform other processing on the flow table associated value when processing the modify flow entry message. After receiving the flow table associated value from the controller, the switch may search for a flow entry stored in the switch, where a flow table associated value in the flow entry matches the flow table associated value currently received from the controller. If the switch finds that the flow table associated value in the flow entry stored in the switch matches the flow table associated value currently received from the controller, the switch may determine that the flow table associated value in the currently found flow entry stored in the switch successfully matches the flow table associated value currently received from the controller, and the switch may determine the currently found flow entry as the matched flow entry.

In a case in which the to-be-modified target information is the old match field, that the switch searches a flow table corresponding to the foregoing flow table identifier for whether there is a flow entry matching the to-be-modified target information includes: determining, by the switch in the flow table, whether a match field in a currently found flow entry matches the old match field; and if the match field in the currently found flow entry matches the old match field, determining the currently found flow entry as the matched flow entry.

Specifically, the switch may search, according to the old match field, a flow entry that needs to be modified. After the switch receives the old match field from the controller, the switch may search whether a match field in a flow entry that is in the flow table corresponding to the foregoing flow table identifier and stored in the switch matches the old match field. If the switch finds that the match field in the flow entry stored in the switch matches the old match field, the switch may determine that the match field in the currently found flow entry stored in the switch successfully matches the old match field, and the switch may determine the currently found flow entry as the matched flow entry.

Step S150: In a case in which there is the flow entry matching the to-be-modified target information, the switch changes a match field in the matched flow entry to the new match field.

Specifically, after determining the matched flow entry, the switch may change the match field in the matched flow entry to the new match field, and the flow entry immediately becomes effective after being modified.

According to an existing flow table modifying method, if N flow entries are to be modified, the switch needs to receive 2N modify flow entry messages from the controller, where each modify flow entry message carries a complete match field or action field, resulting in high information redundancy, low efficiency, and an overloaded interface. By comparison, according to the flow table modifying method in this embodiment of the present invention, if N flow entries are to be modified, the switch receives at most N modify flow entry messages from the controller, which improves efficiency and alleviates load on an interface. In addition, according to the flow table modifying method in this embodiment of the present invention, only the flow entry matching the to-be-modified target information is identified and modified, which reduces information redundancy.

In a possible implementation manner, in a case in which there is no flow entry matching the to-be-modified target information, the switch sends an error indication to the controller, where the error indication is used to notify the controller of a failure in modifying the flow table.

Specifically, if the switch finds that in the flow entry stored in the switch, there is no flow entry matching the to-be-modified target message, the switch may send the error indication to the controller. The error indication may merely notify the controller of the failure in modifying the flow table and does not notify the controller of a specific cause of the failure in modifying the flow table, or the error indication may both notify the controller of the failure in modifying the flow table and notify the controller of a specific cause of the failure in modifying the flow table.

According to the flow table modifying method in this embodiment, a switch receives a modify flow entry message sent by a controller, searches a flow table corresponding to a flow table identifier for a flow entry matching to-be-modified target information, and changes a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 2

FIG. 2 is a flowchart of a flow table modifying method according to Embodiment 2 of the present invention. As shown in FIG. 2, the flow table modifying method mainly includes:

Step S210: A controller sends a modify flow entry message to a switch, where the modify flow entry message includes a flow table identifier, an operation type, to-be-modified target information, and a new match field, and the modify flow entry message is used to instruct the switch to search a flow table corresponding to the flow table identifier for a flow entry matching the to-be-modified target information and to change a match field in the matched flow entry to the new match field.

Specifically, the controller may send the modify flow entry message to the switch, so that the switch modifies the flow entry. If the switch receives the modify flow entry message sent by the controller, the switch may determine, according to the flow table identifier, a flow table that needs to be modified, further determine, according to the to-be-modified target information, a flow entry that needs to be modified in the flow table that needs to be modified, and change a match field in the flow entry that needs to be modified to the new match field, where the flow entry that needs to be modified is a flow entry matching the to-be-modified target information. For a specific example, refer to a description related to step S110 in the foregoing Embodiment 1. The to-be-modified target information may be a flow table associated value or an old match field.

In a case in which the to-be-modified target information is the flow table associated value, the switch may search the flow table corresponding to the foregoing flow table identifier for whether a flow table associated value in a flow entry that is previously sent by the controller and stored in the switch matches the flow table associated value currently sent by the controller. If the switch finds that the flow table associated value in the flow entry that is previously sent by the controller and stored in the switch matches the flow table associated value currently sent by the controller, the switch may determine that the flow table associated value in the currently found flow entry successfully matches the flow table associated value currently sent by the controller, and the switch may determine the currently found flow entry as the matched flow entry and may change the match field in the matched flow entry to the new match field. For a specific example, refer to descriptions related to step S130 and step S150 in the foregoing Embodiment 1.

In a case in which the to-be-modified target information is the old match field, the switch may search the flow table corresponding to the foregoing flow table identifier for whether a match field in a flow entry stored in the switch matches the old match field. If the switch finds that the match field in the flow entry stored in the switch matches the old match field, the switch may determine that the match field in the currently found flow entry stored in the switch successfully matches the old match field, and the switch may determine the currently found flow entry as the matched flow entry and may change the match field in the matched flow entry to the new match field. For a specific example, refer to descriptions related to step S130 and step S150 in the foregoing Embodiment 1.

In a possible implementation manner, the controller receives an error indication sent by the switch, where the error indication is used to notify the controller of a failure in modifying the flow table.

Specifically, if the switch finds that in the flow entry stored in the switch, there is no flow entry matching the to-be-modified target message, the controller may receive the error indication sent by the switch. The error indication may merely notify the controller of the failure in modifying the flow table and does not notify the controller of a specific cause of the failure in modifying the flow table, or the error indication may both notify the controller of the failure in modifying the flow table and notify the controller of a specific cause of the failure in modifying the flow table.

According to the flow table modifying method in this embodiment, a controller sends a modify flow entry message to a switch, to instruct the switch to search a flow table corresponding to a flow table identifier for a flow entry matching to-be-modified target information and to change a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 3

Figure 3:
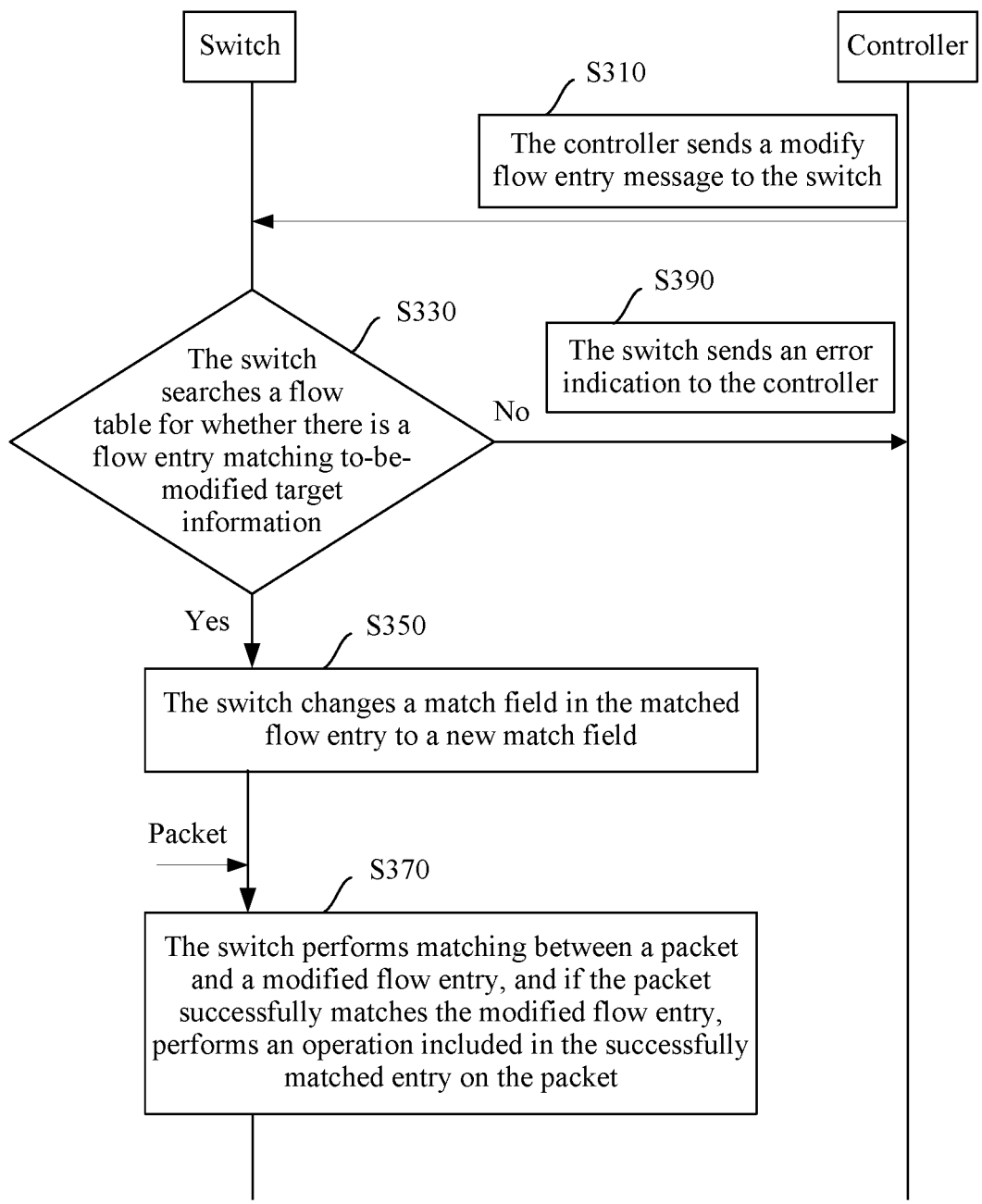
FIG. 3 is a flowchart of a flow table modifying method according to Embodiment 3 of the present invention.

FIG. 3 is a flowchart of a flow table modifying method according to Embodiment 3 of the present invention. As shown in FIG. 3, the flow table modifying method mainly includes:

Step S310: A controller sends a modify flow entry message to a switch to instruct the switch to modify a match field in a flow entry according to the modify flow entry message.

Step S330: The switch searches, according to the modify flow entry message, a flow table matching a flow table identifier for whether there is a flow entry matching to-be-modified target information in the modify flow entry message; and if there is the flow entry, in the flow table, matching the to-be-modified target information in the modify flow entry message, executes step S350 and step S370; or if there is no flow entry, in the flow table, matching the to-be-modified target information in the modify flow entry message, executes step S390.

Step S350: The switch changes a match field in the matched flow entry to a new match field in the modify flow entry message.

Specifically, the controller may send the modify flow entry message to the switch, so that the switch modifies the flow entry. After receiving the modify flow entry message, the switch may search the flow table matching the flow table identifier for whether there is a flow entry matching the to-be-modified target message. The to-be-modified target information may be a flow table associated value or an old match field. For a specific example in which the switch searches the flow table for the flow entry matching the to-be-modified target information, refer to a description related to step S130 in the foregoing Embodiment 1. After determining the matched flow entry, the switch may change the match field in the matched flow entry to the new match field.

Step S370: The switch performs matching between a packet and a modified flow entry, and if the packet successfully matches the modified flow entry, performs an operation included in the successfully matched entry on the packet.

Step S390: The switch sends an error indication to the controller, where the error indication is used to notify the controller of a failure in modifying the flow table.

Specifically, if the switch finds that in a flow entry stored in the switch, there is no flow entry matching the to-be-modified target message, the switch may send the error indication to the controller. For details, refer to a description related to step S150 in the foregoing Embodiment 1.

According to the flow table modifying method in this embodiment, a controller sends a modify flow entry message to a switch, to assign the switch to search a flow table corresponding to a flow table identifier for a flow entry matching to-be-modified target information and to change a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 4

Figure 4A:
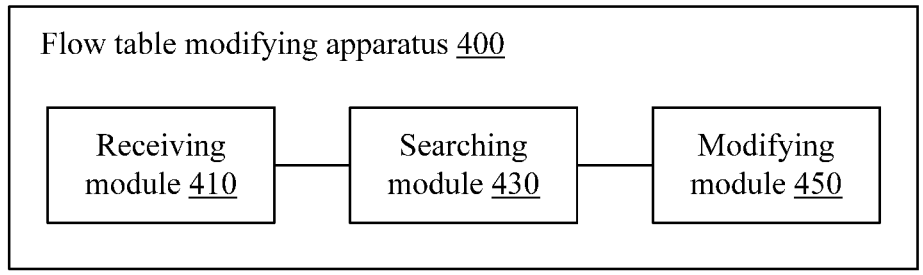
FIG. 4a is a structural block diagram of a flow table modifying apparatus according to Embodiment 4 of the present invention.

FIG. 4a is a structural block diagram of a flow table modifying apparatus according to Embodiment 4 of the present invention. As shown in FIG. 4a, the flow table modifying apparatus 400 mainly includes: a receiving module 410, a searching module 430, and a modifying module 450.

The receiving module 410 is configured to receive a modify flow entry message sent by a controller, where the modify flow entry message includes a flow table identifier, an operation type, to-be-modified target information, and a new match field.

Specifically, the flow table modifying apparatus 400 may be a switch. If the receiving module 410 receives the modify flow entry message sent by the controller, the flow table modifying apparatus 400 may perform corresponding processing on a flow entry specified by the to-be-modified target information. In addition to the flow table identifier, the to-be-modified target information, and the new match field, the modify flow entry message should further include the operation type. In addition to deleting and adding, the operation type may further include modifying. The flow table modifying apparatus 400 may determine, according to the flow table identifier, a flow table that needs to be modified, further determine, according to the to-be-modified target information, a flow entry that needs to be modified in the flow table that needs to be modified, and change a match field in the flow entry that needs to be modified to the new match field, where the flow entry that needs to be modified is a flow entry matching the to-be-modified target information. For a specific example, refer to a description related to step S110 in the foregoing Embodiment 1.

The searching module 430 is connected to the receiving module 410 and configured to search a flow table corresponding to the flow table identifier for whether there is the flow entry matching the to-be-modified target information received by the receiving module 410.

Specifically, after the receiving module 410 receives the modify flow entry message from the controller, the searching module 430 may determine, according to the flow table identifier, a flow table that needs to be modified, and further search the flow table that needs to be modified for whether there is a flow entry matching the to-be-modified target message. The to-be-modified target information may be a flow table associated value or an old match field.

In a possible implementation manner, the to-be-modified target information is the flow table associated value, and the searching module 430 is configured to: determine, in the flow table, whether a flow table associated value in a currently found flow entry matches the flow table associated value received by the receiving module 410; and if it is determined that the flow table associated value in the currently found flow entry matches the flow table associated value received by the receiving module 410, determine the currently found flow entry as the matched flow entry. For a specific example, refer to a description related to step S130 in the foregoing Embodiment 1.

In a possible implementation manner, the to-be-modified target information is the old match field, and the searching module 430 is configured to: determine, in the flow table, whether a match field in a currently found flow entry matches the old match field received by the receiving module 410; and if it is determined that the match field in the currently found flow entry matches the old match field received by the receiving module 410, determine the currently found flow entry as the matched flow entry. For a specific example, refer to a description related to step S130 in the foregoing Embodiment 1.

The modifying module 450 is connected to the searching module 430 and configured to: in a case in which the searching module 430 finds that there is the flow entry matching the to-be-modified target information, change a match field in the matched flow entry to the new match field. For a specific example, refer to a description related to step S150 in the foregoing Embodiment 1.

Figure 4B:
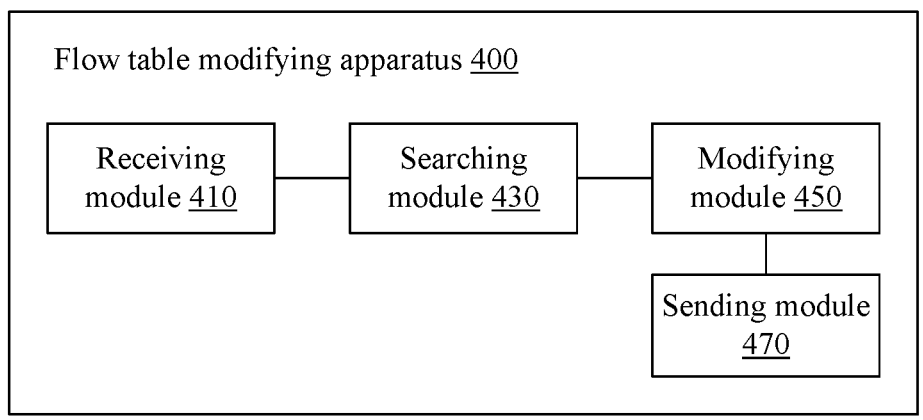
FIG. 4b is another structural block diagram of the flow table modifying apparatus according to Embodiment 4 of the present invention.

FIG. 4*b* is another structural block diagram of the flow table modifying apparatus 400 according to Embodiment 4 of the present invention. As shown in FIG. 4*b*, in a possible implementation manner, the flow table modifying apparatus 400 may further include: a sending module 470, connected to the searching module 430 and configured to: in a case in which the searching module 430 finds that there is no flow entry matching the to-be-modified target information, send an error indication to the controller, where the error indication is used to notify the controller of a failure in modifying the flow table. For a specific example, refer to a description related to step S150 in the foregoing Embodiment 1.

According to the flow table modifying apparatus in this embodiment, a receiving module receives a modify flow entry message sent by a controller, a searching module searches a flow table corresponding to a flow table identifier for a flow entry matching to-be-modified target information, and in a case in which the searching module finds the flow entry matching the to-be-modified target information, a modifying module changes a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 5

Figure 5:
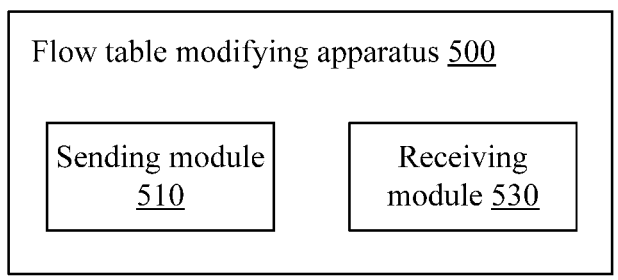
FIG. 5 is a structural block diagram of a flow table modifying apparatus according to Embodiment 5 of the present invention.

FIG. 5 is a structural block diagram of a flow table modifying apparatus according to Embodiment 5 of the present invention. As shown in FIG. 5, the flow table modifying apparatus 500 mainly includes:

a sending module 510, configured to send a modify flow entry message to a switch, where the modify flow entry message includes a flow table identifier, an operation type, to-be-modified target information, and a new match field, and the modify flow entry message is used to instruct the switch to search a flow table corresponding to the flow table identifier for a flow entry matching the to-be-modified target information and to change a match field in the matched flow entry to the new match field. The flow table modifying apparatus 500 may be a controller. For a specific example, refer to a description related to step S210 in the foregoing Embodiment 2.

In a possible implementation manner, the to-be-modified target information is a flow table associated value or an old match field. For a specific example, refer to descriptions related to step S130 and step S150 in the foregoing Embodiment 1.

In a possible implementation manner, the flow table modifying apparatus 500 may further include: a receiving module 530, configured to receive an error indication sent by the switch, where the error indication is used to notify the flow table modifying apparatus 500 of a failure in modifying the flow table. For a specific example, refer to a description related to step S150 in the foregoing Embodiment 1.

According to the flow table modifying apparatus in this embodiment, a sending module sends a modify flow entry message to a switch, to assign the switch to search a flow table corresponding to a flow table identifier for a flow entry matching to-be-modified target information and to change a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 6

Figure 6:
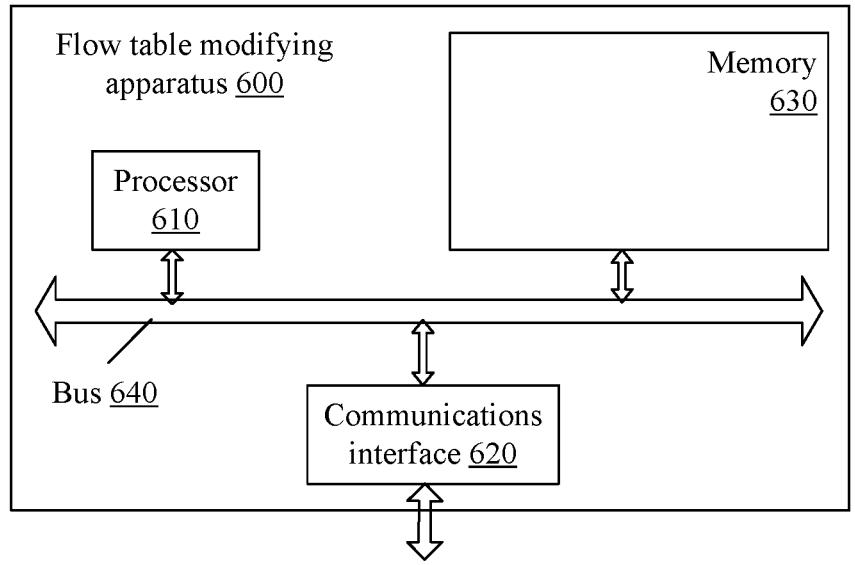
FIG. 6 is a structural block diagram of a flow table modifying apparatus according to Embodiment 6 of the present invention.

FIG. 6 is a structural block diagram of a flow table modifying apparatus 600 according to Embodiment 6 of the present invention. The flow table modifying apparatus 600 includes a processor (processor) 610, a communications interface (communications interface) 620, a memory (memory) 630, and a bus 640. The processor 610, the communications interface 620, and the memory 630 complete mutual communication by using the bus 640.

The processor 610 is configured to execute a program. The processor 610 may be a central processing unit CPU, or include a central processing unit CPU and a hardware chip, where the hardware chip may include a complex programmable logical device (CPLD).

The memory 630 may be a volatile memory (volatile memory), such as a random-access memory (random-access memory, RAM), or a non-volatile memory (non-volatile memory), such as a read-only memory (read-only memory, ROM), a flash memory (flash memory), a hard disk (HD), or a solid-state disk (SSD). The memory 630 is connected to the processor 610.

In a possible implementation manner, the foregoing program may be program code including a computer operation instruction. According to a program instruction, the processor 610 executes the following steps:

receiving a modify flow entry message sent by a controller, where the modify flow entry message includes a flow table identifier, an operation type, to-be-modified target information, and a new match field;

searching a flow table corresponding to the flow table identifier for whether there is a flow entry matching the to-be-modified target information; and in a case in which there is the flow entry matching the to-be-modified target information, changing a match field in the matched flow entry to the new match field.

The flow table modifying apparatus in this embodiment of the present invention receives a modify flow entry message, searches a flow table corresponding to a flow table identifier for a flow entry matching to-be-modified target information, and changes a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 7

Figure 7:
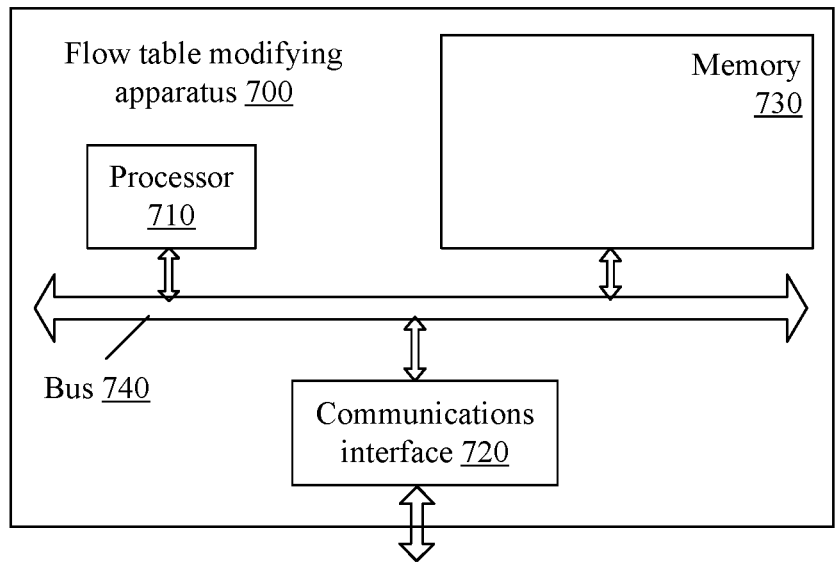
FIG. 7 is a structural block diagram of a flow table modifying apparatus according to Embodiment 7 of the present invention.

FIG. 7 is a structural block diagram of a flow table modifying apparatus 700 according to Embodiment 7 of the present invention. The flow table modifying apparatus 700 includes a processor (processor) 710, a communications interface (communications interface) 720, a memory (memory) 730, and a bus 740. The processor 710, the communications interface 720, and the memory 730 complete mutual communication by using the bus 740.

The processor 710 is configured to execute a program. The processor 710 may be a central processing unit CPU, or may include a central processing unit CPU and a hardware chip, where the hardware chip may include a complex programmable logical device (complex programmable logic apparatus, CPLD).

The memory 730 may be a volatile memory (volatile memory), such as a random-access memory (random-access memory, RAM), or a non-volatile memory (non-volatile memory), such as a read-only memory (read-only memory, ROM), a flash memory (flash memory), a hard disk drive (hard disk drive, HDD), or a solid-state disk (solid-state drive, SSD). The memory 730 is connected to the processor 710.

In a possible implementation manner, the foregoing program may be program code including a computer operation instruction. According to a program instruction, the processor 710 executes the following step:

sending a modify flow entry message to a switch, where the modify flow entry message includes a flow table identifier, an operation type, to-be-modified target information, and a new match field, and the modify flow entry message is used to instruct the switch to search a flow table corresponding to the flow table identifier for a flow entry matching the to-be-modified target information and to change a match field in the matched flow entry to the new match field.

The flow table modifying apparatus in this embodiment of the present invention sends a modify flow entry message to a switch, to assign the switch to search a flow table corresponding to a flow table identifier for a flow entry matching to-be-modified target information and to change a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

Embodiment 8

Figure 8:
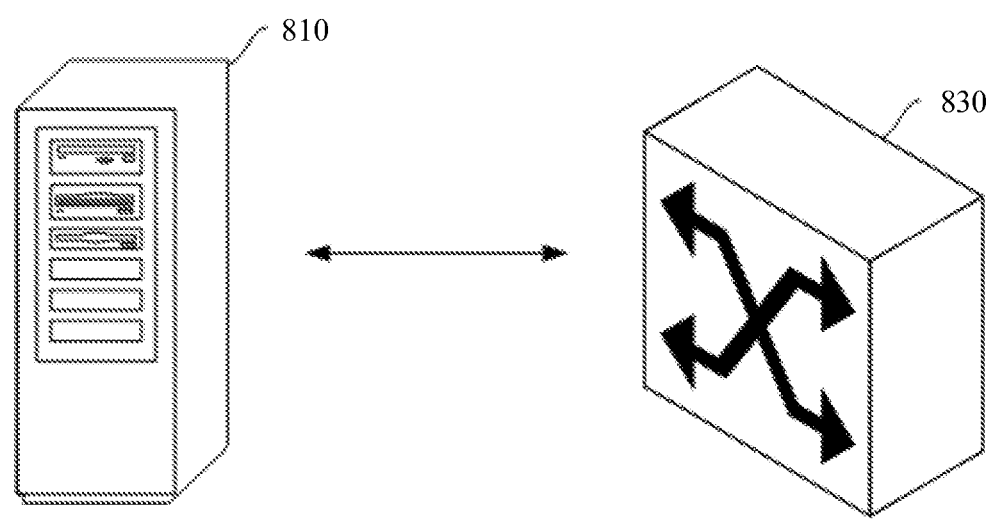
FIG. 8 is a structural block diagram of an OpenFlow network system according to Embodiment 8 of the present invention.

FIG. 8 is a structural block diagram of an OpenFlow network system according to Embodiment 8 of the present invention. As shown in FIG. 8, the OpenFlow network system mainly includes: a controller 810 and a switch 830.

The flow table modifying apparatus 400 in the foregoing Embodiment 4 or the flow table modifying apparatus 600 in Embodiment 6 is used as the switch 830. The flow table modifying apparatus 500 in the foregoing Embodiment 5 or the flow table modifying apparatus 700 in Embodiment 7 is used as the controller 810. For details, refer to descriptions related to the foregoing Embodiment 1 to Embodiment 7.

According to the OpenFlow network system in this embodiment, a switch receives a modify flow entry message sent by a controller, searches a flow table corresponding to a flow table identifier for a flow entry matching to-be-modified target information, and changes a match field in the matched flow entry to a new match field. In this way, the flow table is efficiently modified and load on an interface is alleviated. In addition, only the flow entry matching the to-be-modified target information is identified and modified, reducing information redundancy of modifying the flow table.

A person of ordinary skill in the art may be aware that exemplary units and algorithm steps in the embodiments described in the specification may be implemented by computer software. To some extent, it may be considered that all or a part (for example, the part contributing to the prior art) of the technical solutions of the present invention is embodied in a form of a computer software product. The computer software product is generally stored in a computer readable storage medium and includes several instructions for instructing a computer apparatus (which may be a personal computer, a server, or a network apparatus, and the like) to perform all or some of the steps of the methods described in the embodiments of the present invention. The foregoing storage medium includes: any medium that can store program code, such as a USB flash drive (USB flash drive), a removable hard disk, a read-only memory (read-only memory, ROM), a random-access memory (random-access memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of modifying a flow table, comprising:

receiving, by a switch, a modify flow entry message sent by a controller, wherein the modify flow entry message comprises a flow table identifier, an operation type, to-be-modified target information, and a new match field;

searching, by the switch, the flow table corresponding to the flow table identifier to check whether a flow entry matching the to-be-modified target information exists;

when there is the flow entry matching the to-be-modified target information, modifying the flow table by changing, by the switch, a match field in the matched flow entry to the new match field; and alleviating, by the switch and based on the modified flow table, load on an interface.

2. The method according to claim 1, wherein the to-be-modified target information is a flow table associated value; and the searching, by the switch, a flow table corresponding to the flow table identifier for whether there is a flow entry matching the to-be-modified target information comprises:

determining, by the switch in the flow table, whether a flow table associated value in a currently found flow entry matches the received flow table associated value; and if the flow table associated value in the currently found flow entry matches the received flow table associated value, determining the currently found flow entry as the matched flow entry.

3. The method according to claim 1, wherein the to-be-modified target information is an old match field; and the searching, by the switch, a flow table corresponding to the flow table identifier for whether there is a flow entry matching the to-be-modified target information comprises:

determining, by the switch in the flow table, whether a match field in a currently found flow entry matches the old match field; and when the match field in the currently found flow entry matches the old match field, determining the currently found flow entry as the matched flow entry.

4. The method according to claim 1, wherein:

in a case in which there is no flow entry matching the to-be-modified target information, the switch sends an error indication to the controller, wherein the error indication is used to notify the controller of a failure in modifying the flow table.

5. A method of modifying a flow table, comprising:

sending, by a controller, a modify flow entry message to a switch, wherein the modify flow entry message comprises a flow table identifier, an operation type, to-be-modified target information, and a new match field, and the modify flow entry message is used to instruct the switch to search the flow table corresponding to the flow table identifier for a flow entry matching the to-be-modified target information and to modify the flow table by changing a match field in the matched flow entry to the new match field; and alleviating, by the switch and based on the modified flow table, load on an interface.

6. The method according to claim 5, wherein the to-be-modified target information is a flow table associated value or an old match field.

7. The method according to claim 5, wherein:

the controller receives an error indication sent by the switch, wherein the error indication is used to notify the controller of a failure in modifying the flow table.

8. A flow table modifying apparatus, comprising:

a memory to store instructions; and a processor to execute the instructions to configure the flow table modifying apparatus to:

receive a modify flow entry message sent by a controller, wherein the modify flow entry message comprises a flow table identifier, an operation type, to-be-modified target information, and a new match field;

search a flow table corresponding to the flow table identifier for whether there is a flow entry matching the to-be-modified target information received by the receiver; and in a case in which there is the flow entry matching the to-be-modified target information, modify the flow table by changing a match field in the matched flow entry to the new match field to alleviate load on an interface.

9. The flow table modifying apparatus according to claim 8, wherein the to-be-modified target information is a flow table associated value, and the flow table modifying apparatus is configured to:

determine, in the flow table, whether a flow table associated value in a currently found flow entry matches the flow table associated value received by the receiver; and when it is determined that the flow table associated value in the currently found flow entry matches the flow table associated value received by the receiver, determine the currently found flow entry as the matched flow entry.

10. The flow table modifying apparatus according to claim 8, wherein the to-be-modified target information is an old match field, and the flow table modifying apparatus is configured to:

determine, in the flow table, whether a match field in a currently found flow entry matches the old match field received by the receiver; and when it is determined that the match field in the currently found flow entry matches the old match field, determine the currently found flow entry as the matched flow entry.

11. The flow table modifying apparatus according to claim 8, wherein the processor is further configured to: in a case in which there is no flow entry matching the to-be-modified target information, send an error indication to the controller, wherein the error indication is used to notify the controller of a failure in modifying the flow table.

12. A flow table modifying apparatus, comprising:

a memory to store instructions; and a processor to execute the instructions to configure the flow table modifying apparatus to:

send a modify flow entry message to a switch, wherein the modify flow entry message comprises a flow table identifier, an operation type, to-be-modified target information, and a new match field, and the modify flow entry message is used to instruct the switch to search a flow table corresponding to the flow table identifier for a flow entry matching the to-be-modified target information and to modify the flow table by changing a match field in the matched flow entry to the new match field to alleviate load on an interface.

13. The flow table modifying apparatus according to claim 12, wherein the to-be-modified target information is a flow table associated value or an old match field.

14. The flow table modifying apparatus according to claim 12, wherein the flow table modifying apparatus is further configured to receive an error indication sent by the switch, wherein the error indication is used to notify the flow table modifying apparatus of a failure in modifying the flow table.

* * * * *